UNITED STATES PATENT OFFICE.

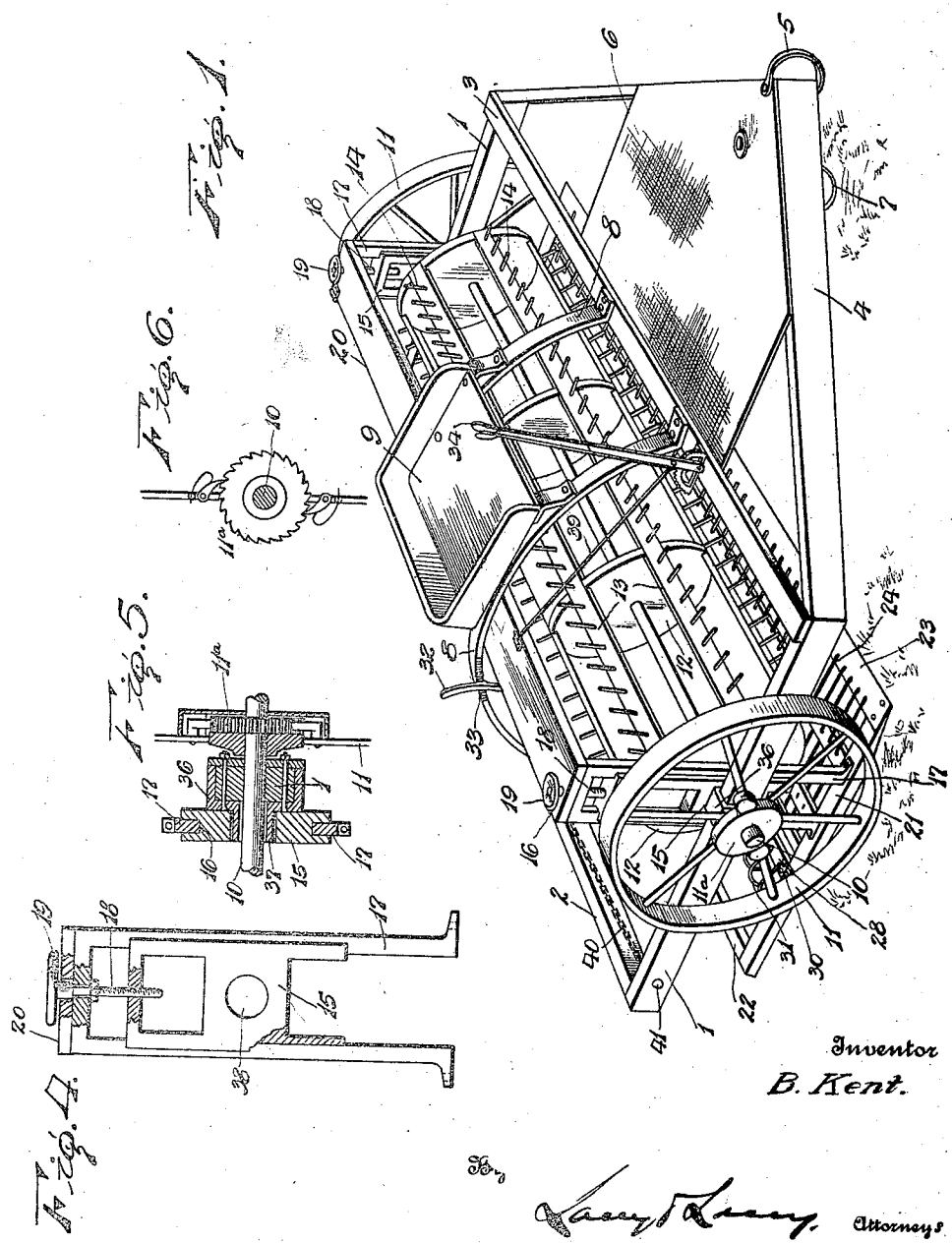

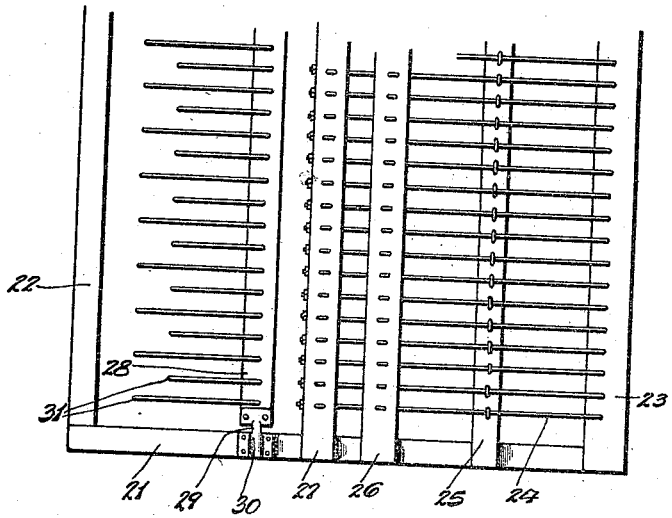
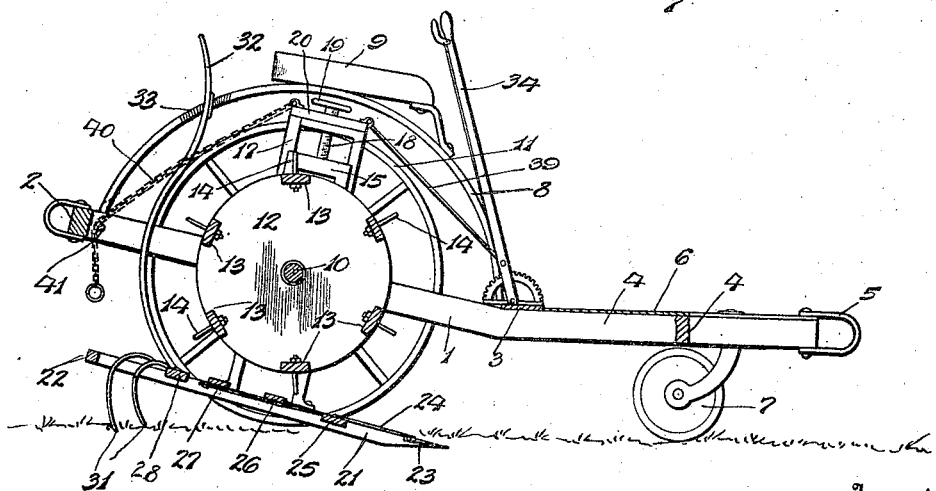

BUDD KENT, OF WOODBURN, OREGON.

CLOD CRUSHER.

1,425,976.   Specification of Letters Patent.   Patented Aug. 15, 1922.

Application filed July 19, 1921. Serial No. 485,877.

*To all whom it may concern:*

Be it known that I, BUDD KENT, a citizen of the United States, residing at Woodburn, in the county of Marion and State of Oregon, have invented certain new and useful Improvements in Clod Crushers, of which the following is a specification.

This invention relates to clod crushers and soil pulverizers and has for its object the provision of an implement by the use of which the clods in a field will be effectually broken up and pulverized and the surface soil reduced to a fine mulch ready for planting and in proper condition to facilitate a healthy growth of plants. The invention is illustrated in the accompanying drawings and will be hereinafter fully set forth.

In the drawings—

Figure 1 is a perspective view of a machine embodying my improvements;

Fig. 2 is a side elevation of the same with one ground wheel and the end of the frame adjacent the same removed;

Fig. 3 is a plan view of the lower frame and the parts mounted thereon;

Fig. 4 is a detail elevation of the adjustable bearing for the ground wheel;

Fig. 5 is a horizontal section through the said bearing;

Fig. 6 is a detail view of an escapement.

The main frame of my improved machine comprises end or side bars 1 and a rear transverse bar 2 connecting the same, a front cross bar 3 also connecting the end or side bars, and forwardly converging bars 4 extending from the front ends of the bars 1. A clevis or other draft-attaching device 5 is provided at the front ends of the converging bars 4, and a foot rest or platform 6 is carried by the said bars and the front cross bar 3, a caster 7 being connected with the platform 6 so as to aid in supporting the same, as shown and as will be readily understood. Arched bars 8 extend between and are secured to the cross bars 2 and 3 and support a seat 9, as shown. An axle or driving shaft 10 is rotatably fitted in the side or end bars 1 and extends entirely across the machine, the ground wheels 11 being fitted upon the ends of the axle and connected therewith by escapement devices, indicated at 11ª, whereby, upon forward travel of the machine, the axle will be rotated but upon backward movement the axle will remain at rest. Upon the axle, between the side bars 1, I secure a beating cylinder consisting of discs 12 and tooth bars or strips 13 extending across the edges of the said discs and secured rigidly thereto, teeth or pins 14 being carried by and projecting radially from the said bars 13, as clearly shown. Fitted around the axle adjacent the bars 1 are bearing frames 15 in the side edges of which are grooves 16 which slidably receive the side members of inverted U-shaped standards 17 and a jack screw 18 is fitted through the head of this standard and swiveled therein, the lower portion of the said screw having threaded engagement with the upper end of the bearing frame 15. A hand wheel 19 is provided at the upper end of the jack screw so that the screw may be easily rotated, and it will be readily seen that rotation of the screw will cause the same to ride up or down in the head of the bearing frame and thereby effect vertical movement of the standard. The standard is duplicated at the two sides of the machine and the upper ends of the standards are connected by a cross beam 20. The lower ends of the standards 17 are rigidly secured to the end or side bars 21 of the lower frame. The bearings 36 for the axle or driving shaft are secured to the side bars 1, as indicated in Fig. 5, and are provided with end bosses 37 which journal in openings 38 in the respectively adjacent bearing frame 15, thus providing for relative movement of the frames 15 and standards 17 and permitting tilting of the same about the axle.

The rear ends of the side bars 21 are connected by a cross bar 22 and the front ends of the bars 21 are connected by a plate 23 which may be provided with a sharp front edge whereby it will cut readily through the ground and turn over weeds and roots in the surface of the soil as well as lift clods of dirt. The front extremities of the bars 21 are tapered, as clearly shown in Fig. 2, to facilitate their passage through the soil, and sifter rods 24 are secured at their front ends to the cross plate 23 and extend therefrom past the cross bars 25, 26 and 27 to which they are secured. These rods 24 are disposed longitudinally of the frame and are somewhat close together and preferably consist of stout wires. The matter turned up by the blade 23 will be deposited upon these rods and the motion of the machine in traveling over the field will produce sufficient vibration to cause the fine soil to sift between the sifter rods and be deposited upon the ground in a finely pulverized condition. The beating cylinder will, of course, rotate with the ground wheels 11 and the rotation of the cylinder will cause the teeth 14 thereof to ride against the larger clods upon the sifter bars 24 and break up the same into particles which will readily drop through the spaces between the said bars.

In rear of the cross bar 27, I provide a cross bar 28 constituting a rake head which is provided at its ends with pintles or trunnions 29 journaled in bearings 30 upon the bars. Rake teeth 31 are secured to and extend rearwardly from the rake head 28 and ride upon the ground so as to collect weeds and other trash which may be upon the surface of the soil. A hand lever 32 is secured rigidly to the rake head and extends upwardly therefrom in rear of the seat 9 and is adapted to engage locking teeth 33 formed upon the adjacent arch 8. By swinging the upper end of the said lever 32 forwardly, the rake will be rocked and the accumulated weeds and trash will thus be cleared of the rake teeth and may be subsequently easily gathered and destroyed.

Mounted upon the cross bar 3 is a hand lever 34 and a rod 39 connects said hand lever with the beam 20. If the lever 34 be swung forwardly, the standards 17 and the lower frame will be tilted about the axle 10 and the blade 23 thereby caused to run at a greater or less depth, as will be readily understood. A chain 40 is attached to the beam 20 at each end thereof and at the rear edge of the same, the chain being engaged over a bolt 41 on the adjacent bar 1 to limit the forward tilting of the standards and the lower frame.

The use of the machine will be readily understood from the foregoing description, taken in connection with the accompanying drawings, and it will be readily noted that I have provided a very simple and compact mechanism whereby clods will be easily loosened from the surface of the soil and effectually pulverized so that, after the machine has traveled over a field, the surface of the field will be in proper condition for the growth of healthy plants.

Having thus described the invention, what is claimed as new is:

1. A clod crusher comprising a main frame, wheels supporting said frame, a beater cylinder mounted in said frame concentric with the wheels and actuated thereby, and a sifter frame arranged below the beater cylinder and carried by the first-mentioned frame and adapted to run below the surface of the ground and lift the soil and clods to be acted upon by the beater.

2. In a clod crusher, the combination of a main frame, wheels supporting said frame, a beater cylinder mounted upon said frame concentric with and actuated by the wheels, and a sifter frame arranged below and carried by the main frame and comprising a blade, side bars extending rearwardly from the ends of the blade, cross bars secured to and extending between the side bars in rear of the blade, and sifter rods secured at their front ends to the blade and extending rearwardly therefrom under the beater cylinder in parallel spaced relation and secured to the said cross bars.

3. In a clod crusher, the combination of a main frame, an axle mounted in and extending across said frame, wheels fitted upon the ends of the axle to support the frame and actuate the axle, a beater cylinder carried by the axle within the frame, a sifter frame arranged below the main frame, bearing frames encircling the axle adjacent the main frame, standards secured to and rising from the ends of the sifter frame and slidably engaging the said bearing frame, and jack screws having threaded engagement with the bearing frames and swiveled in the standards whereby the sifter frame may be tilted and adjusted vertically.

4. In a clod crusher, the combination of a wheel-supported main frame, a beater mounted upon the main frame, a sifter frame disposed below the main frame and extending under the beater, standards rising from the ends of the sifter frame through and above the main frame and mounted for tilting movement upon the main frame, a connection between said standards, and a lever mounted upon the main frame and operatively connected with the connection between the standards.

In testimony whereof I affix my signature.

BUDD KENT. [L. S.]